United States Patent
Migliori

(10) Patent No.: US 6,971,498 B2
(45) Date of Patent: Dec. 6, 2005

(54) CENTERING DEVICE WITH CLEANING MEANS

(75) Inventor: Luciano Migliori, Milan (IT)

(73) Assignee: Univer S.p.A., Milan (IT)

( * ) Notice: Subject to any disclaimer, the term of this patent is extended or adjusted under 35 U.S.C. 154(b) by 65 days.

(21) Appl. No.: 10/779,762

(22) Filed: Feb. 18, 2004

(65) Prior Publication Data

US 2004/0187237 A1 Sep. 30, 2004

(30) Foreign Application Priority Data

Mar. 28, 2003 (IT) .......................... MI2003 A0622

(51) Int. Cl.⁷ .............................................. B65G 47/24

(52) U.S. Cl. ............................... 198/345.1; 198/345.2; 198/493

(58) Field of Search .......................... 198/345.1, 345.2, 198/345.3, 493, 463.4, 530; 29/406, 33 P, 29/759

(56) References Cited

U.S. PATENT DOCUMENTS

| | | | | |
|---|---|---|---|---|
| 4,069,924 A | * | 1/1978 | McCorkle | .................... 414/787 |
| RE33,641 E | * | 7/1991 | Ackerman | ............... 198/345.1 |
| 5,191,958 A | * | 3/1993 | Tolocko | ........................ 29/430 |
| 5,605,215 A | * | 2/1997 | Gross et al. | ............. 198/345.1 |
| 6,164,430 A | * | 12/2000 | Nishimura | ............... 198/345.1 |
| 6,698,570 B2 | * | 3/2004 | Takai | ....................... 198/345.1 |

FOREIGN PATENT DOCUMENTS

EP          1 123 779        8/2001

* cited by examiner

*Primary Examiner*—James R. Bidwell
(74) *Attorney, Agent, or Firm*—Young & Thompson

(57) ABSTRACT

A centering device provided with cleaning elements for cleaning a movable centering rod, and for preventing infiltration of dirt. The cleaning elements comprise at least one annularly-shaped scraping member provided with angularly spaced apart cross-cuts, which divide the scraping member into circular sections having inner scraping edges. The scraping member is locked against a conical shoulder in such a way as to be elastically yieldable, making the inner scraping edges of the sections adhere to the centering rod.

11 Claims, 3 Drawing Sheets

CENTERING DEVICE WITH CLEANING MEANS

BACKGROUND OF THE INVENTION

This invention concerns a centering device for centering work pieces, used in particular in the automotive industry for positioning metal sheets and/or metal pieces of the body of motor vehicles, which are to be welded or connected along automatic assembly lines.

STATE OF THE ART

In general, a centering device for centering work pieces, such as metal sheets and/or metal pieces of the body of motor vehicles, as described in EP 1 123 779, comprises a hollow casing, and an axially sliding centering rod, which extends from the fore end of the casing to protrude into a hole of a piece or pieces to be assembled. The axial sliding movement of the centering rod is controlled by an actuator, such as an electric motor, or a fluid operated cylinder and/or by a manual control lever.

Since the centering device operates in environments laden with dust and working residuals, the sliding movement of the centering rod facilitates their infiltration into the hollow casing of the device; over time, this can lead to an impaired functioning of the centering device, in that the dirt that penetrates into the casing causes frictional and additional stress between the moving parts.

In an attempt to obviate this problem, the fore end of the casing has been fitted with an annular sealing gasket circumferentially disposed around the centering rod.

With the passing of time, however, this annular gasket tends to wear, losing its sealing properties and thereby enabling the dirt to penetrate again into the casing of the centering device.

OBJECTS OF THE INVENTION

An object of this invention is to provide a centering device of the type described above, which is structurally simple and economical to manufacture, provided with sealing means for the centering rod which constantly prevents the infiltration of dirt and dust into the hollow casing over time, even after prolonged operation of the device.

Another object of the invention is to provide a centering device as specified above, provided with a self adjusting sealing member for the centering rod, suitable for a self-compensation of the wear.

BRIEF DESCRIPTION OF THE INVENTION

The above can be achieved by means of a centering device for centering work pieces according to claim 1.

More specifically, according to the invention a centering device has been provided, comprising:
a hollow casing having front and side walls;
a centering rod slidably supported by said casing to protrude from a guide hole at the front wall;
actuation means operatively connected to the centering rod to move the same from a retracted and an advanced position; and
cleaning means for cleaning the centering rod and preventing the infiltration of dirt into the casing,
characterised in that said cleaning means comprise:
at least one elastically yieldable annularly-shaped scraping member,
said annular scraping member having inner scraping edges and an outer peripheral edge having a geometrical center, and a plurality of angularly spaced apart cross-wise extending cuts or notches, said cross-cuts being conformed and arranged to divide the annular member into a plurality of scraping sections, each having an arch-shaped inner scraping edge;
the inner edges of the scraping sections in a flat condition of the annular member, having a same bending radius, and bending centers differently arranged around the geometrical center of the scraping member; and
locking means for locking and conically conforming the scraping member against a conically-shaped annular surface, and to urge the inner edges of the scraping sections against a side surface of the centering rod.

Further features of the centering device and the scraping member are defined in the dependent claims.

BRIEF DESCRIPTION OF THE DRAWINGS

These and further features according to this invention, will be more clearly evident from the following description with reference to the accompanying drawings, in which.

DETAILED DESCRIPTION OF THE INVENTION

The general features of this invention will be illustrated hereunder by making reference to FIGS. 1 to 4.

Figure 1:
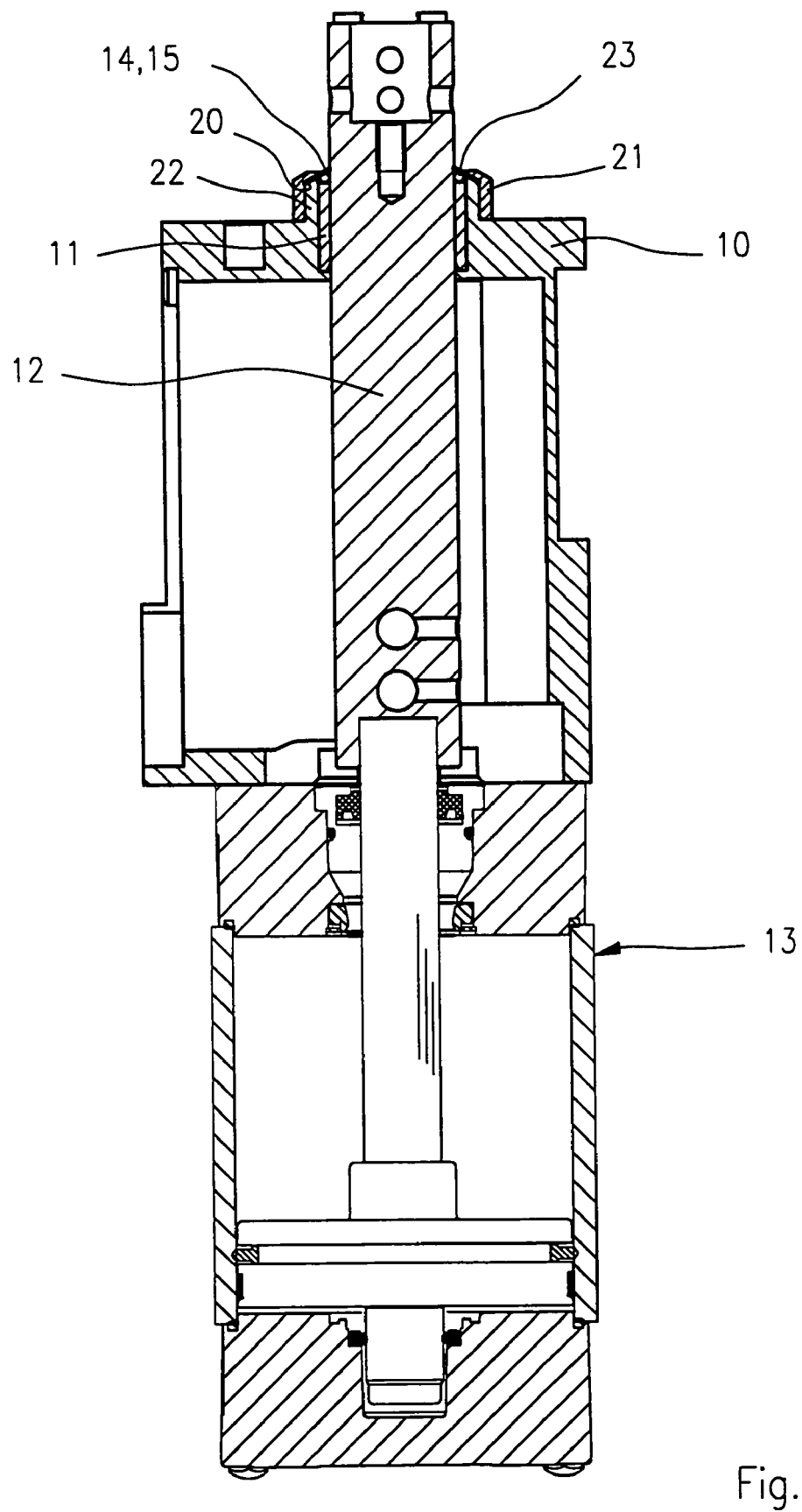
FIG. 1 shows a longitudinal cross-sectional view of the centering device, according to one embodiment of the invention.

The centering device for centering work pieces according to the invention, as shown in the FIG. 1, comprises a hollow casing 10 which extends longitudinally, having a bush 11 at the fore end wall defining a guide hole for a centering rod 12 axially sliding inside the hollow casing 10 according to its longitudinal axis.

The centering rod 12, which protrudes from the front wall of the hollow casing 10 at its fore end, is slidably guided between a forward or advanced position of maximum extension from the hollow casing 10, in correspondence with which the rod 12 fits into a hole of a work piece so as to ensure its centering and positioning during working operations, and a backward or retracted position, shown in FIG. 1, in which the centering rod 12 is partially retracted into the hollow casing 10 to release the work piece.

The centering device also comprises actuation means 13 operatively connected to the centering rod 12, such as for example a pneumatic cylinder 13, or an electric actuator, or a manually operable control lever, not shown.

In order to prevent dust and dirt from penetrating inside the hollow casing 10, the centering device according to the invention is provided with cleaning means for cleaning the centering rod 12, comprising at least one elastically yieldable annularly-shaped scraping member made from a thin metal sheet, such as steel or other suitable material.

According to a preferential embodiment of FIG. 1 to 4, the device comprises first and second superimposed scraping members 14, 15, having inner peripheral edges 14', 15', and outer peripheral edges 14", 15" which define the cross-width of the annular scraping memebers 14,15.

The outer peripheral edges 14", 15" of the two scraping members 14, 15 are in the form of a circular edge having a geometrical center of curvature.

Figure 2:
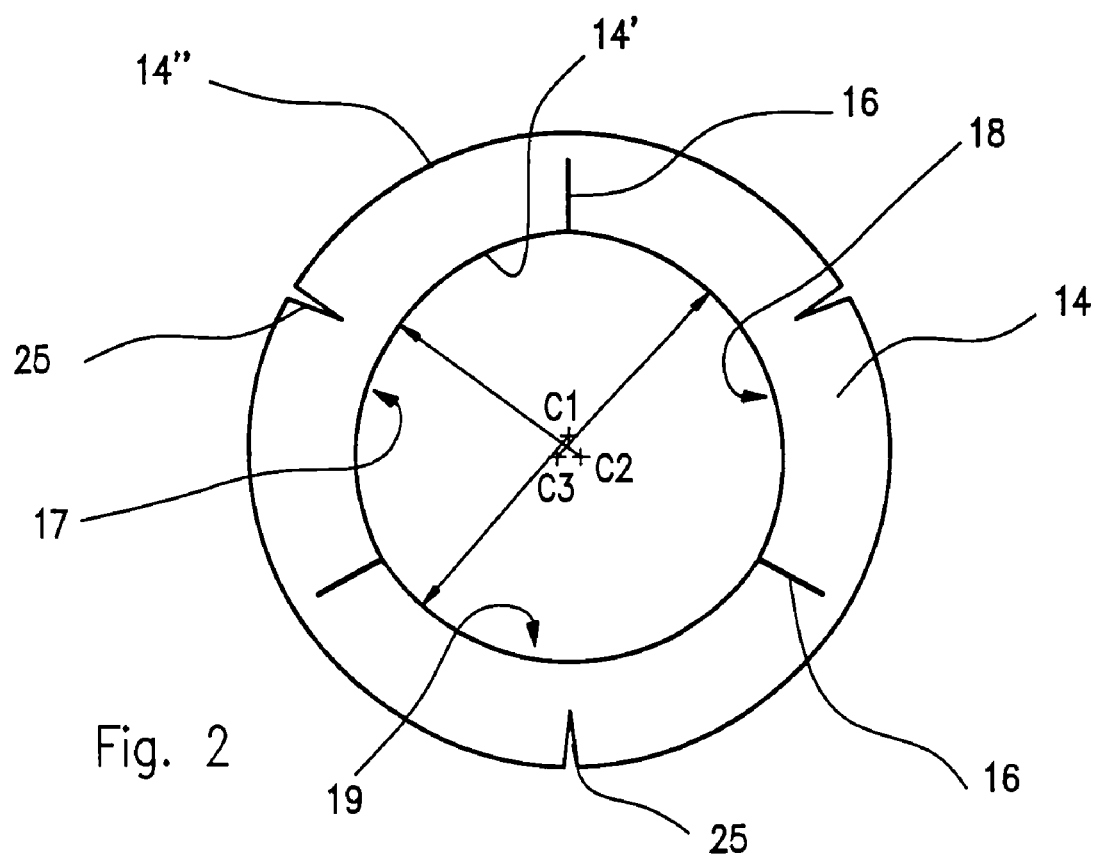
FIG. 2 shows a tap view of a scraping member in a flat condition, according to a first embodiment of the invention.

Each scraping member 14, 15 comprises also a plurality of crosswise extending angularly spaced apart inner cross-cuts or notches; in particular as shown in FIG. 2 for the scraping member 14, the latter comprises a first set of inner cross-cuts 16 which, from the inner peripheral edge 14' radially extend towards the outer edge 14", over part of the width of the same scraping member 14, as shown.

Preferentially, the inner cross-cuts 16 are of the linear type and extend radially over the scraping member 14, for a length equal to or higher than one half the cross width of the same scraping member 14, ending close to the outer edge.

The inner cross-cuts 16 subdivide the annular scraping member 14 into a plurality of scraping sections which, in a flat condition of the scraping member 14 have a same bending radius at their arch-shaped inner scraping edges 17, 18, 19, and center bending points C1, C2, C3 spaced apart from each others, around the aforesaid geometrical center of the scraping member 14.

The inner scraping edges 17, 18, 19 and related center points C1, C2, C3, are conformed and arranged to allow a conical conformation of the scraping member 14 against a conically shaped resting surface, by which the inner scraping edges 17, 18, 19 are elastically urged against a side surface of a cylindrical rod 12.

The device also comprises means for locking and conically conforming the scraping members against a conically-shaped shoulder or annular surface 20, in a condition in which the inner edges 17, 18 and 19 of the scraping sections are extending from the shoulder surface 20 being urged against the centering rod 12.

In fact, when the scraping members 14, 15 are positioned and locked against the shoulder surface 20 by a screw nut 21, and are arranged concentrically to the centering rod 12, the sections of each scraping member 14, 15, thanks to the presence of the cross-cuts 16, can become conically conformed to such a degree as to bring their internal edges 17, 18, 19 fully in contact with the side surface of the centering rod 12, which, on the contrary, cannot occur when the scraping members are in the flat condition, due to the fact that the center bending points C1,C2,C3 of the inner edges of the scraping sections, are spaced apart from and around the geometrical center of the same scraping member 14, 15, which must be coincident with the longitudinal axis of the centering rod 12.

Since the scraping members 14, 15 become elastically deformed, they tend to tightly adhere by their internal edges 17, 18, 19, to the centering rod 12, thereby causing a decisive scraping action in order to clean the rod 12 and to prevent dirt from penetrating inside of the hollow casing 10; compensation of wear to which the scraping members 14, 15 are subjected over time, will also be achieved.

Figure 4:
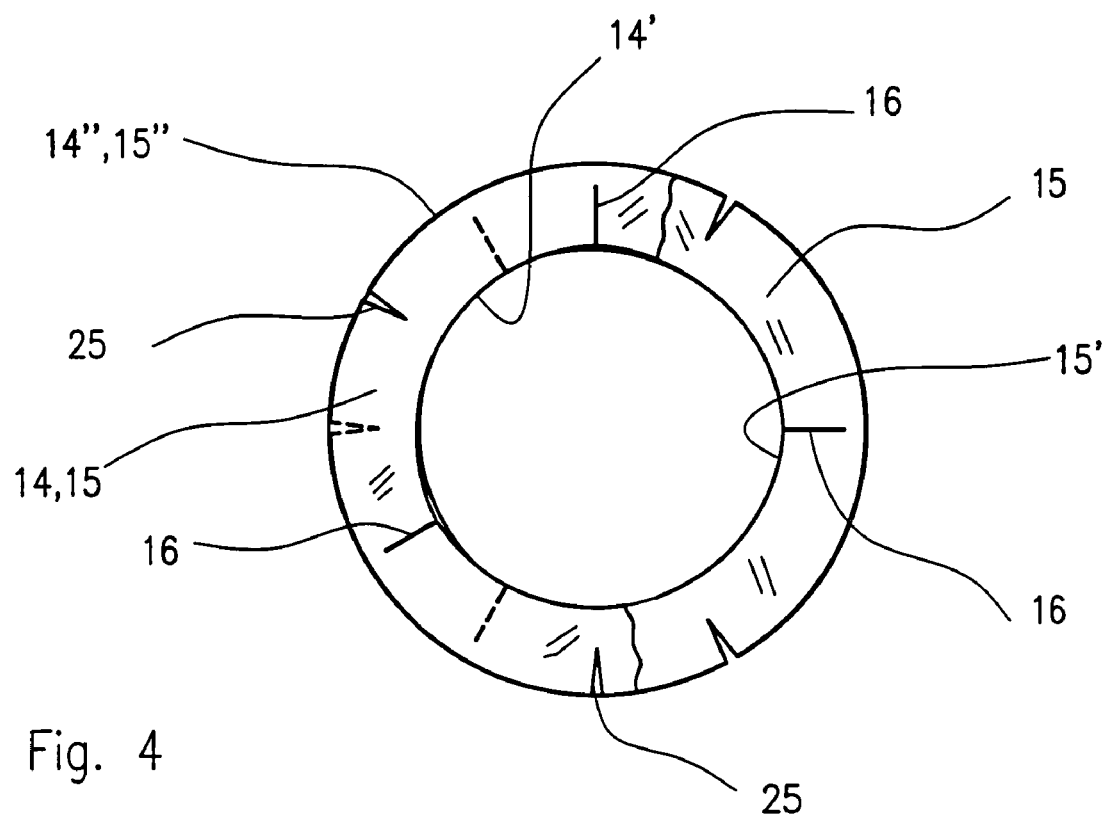
FIG. 4 shows a tap view of two superimposed scraping members in a flat condition.

Since the cross-cuts 16 tend to open their edges when the scraping members 14, 15 are conically conformed, as shown in FIG. 4, at least two scraping members 14, 15 may be overlapped with an offset disposition in which the cross-cuts 16 of the first scraping member 14 are angularly spaced apart from the cross-cuts 16 of the second scraping member 15, so as not to leave slits through which the dirt could pass.

Preferentially, each scraping member 14, 15 comprises a number of circular sections 17, 18, 19 equal to or more than three, so as to allow their cone-shaped conformation.

Figure 3:
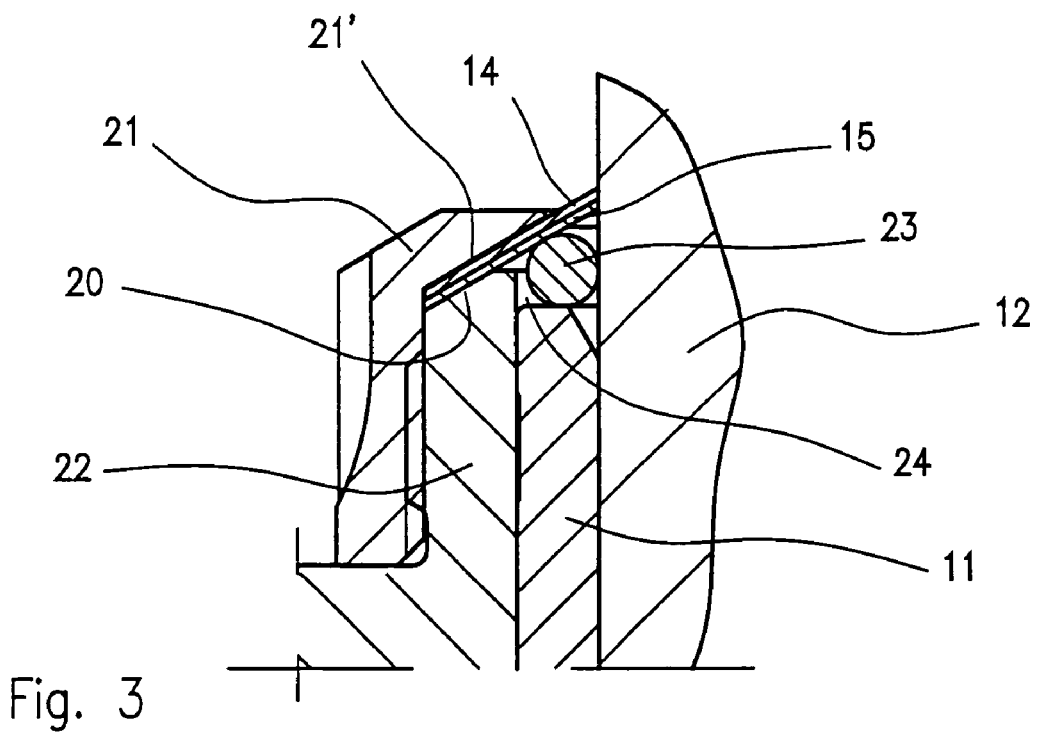
FIG. 3 shows an enlarged detail of FIG. 1.

As shown in the enlarged view of FIG. 3, the scraping members 14, 15 are removably secured to the front wall of the body 10. For such purpose, suitable locking means for locking and conforming the scraping members 14, 15 can comprise a threaded ring nut 21 which can be screwed onto a circular neck 22 of the casing 10, provided at one end with the aforesaid shoulder surface 20.

In order to conically conform the scraping members 14, 15, against the shoulder surface 20, the threaded ring nut 21 must be provided with an internal conical surface 21', which is opposite to the conical shoulder surface 20.

The scraping members 14, 15 in the assembled condition of FIG. 3, are protruding from the shoulder surface 20, against the centering rod 12; in order to avoid an excessive bending of the inside edges of the scraping members 14, 15, and to maintain the required contact pressure between their inner edges 17, 18, 19 and the side surface of the centering rod 12, the device also comprises elastically yielding support means, for example in the form of an annular element or O-ring 23 disposed between the scraping members 14, 15 and an annular seat 24 defined by the neck 22, the guide bush 11 and the centering rod 12.

As mentioned above, the O-ring 23 is provided to miantain the inner edges of the scraping members in contact with the centering rod 12 during the axial movement of the same, thereby automatically adjusting the force with which the scraping members 14, 15 adhere to the centering rod 12, thanks to the action exerted by the aforesaid biasing O-ring.

Preferentially, in order to allow an easier cone conformation of each scraping member 14, 15, as shown in FIGS. 2 and 4, each scraping member 14, 15 can be provided with a second set of outer cross-cuts 25 which extend from the outer peripheral edge in intermediate positions between the inner cross-cuts 16.

The outer cross-cuts 25 present spaced apart side edges, which open out towards the outer edge of the scraping members 14, 15, so that the latter can more easily assume a cone-shaped disposition thanks to the possibility of the outer cuts 25 to close their side edges, during cone conformation.

Preferentially, the outer cross-cuts 25 are V-shaped or U-shaped, and extend from the outer peripheral edge 14", 15" of the scraping members 14, 15 for a length equivalent to or less than one half the width of the annular scraping members 14,15.

Figure 5:
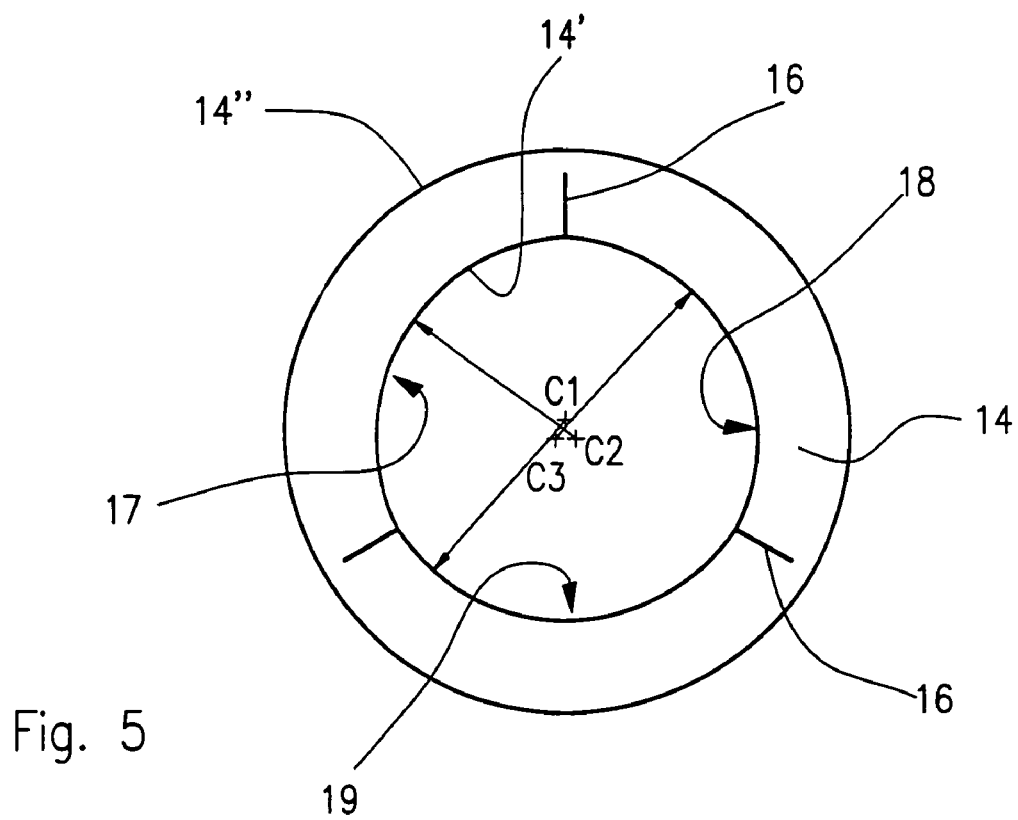
FIG. 5 shows a tap view of a scraping member in a flat condition, according to a further embodiment of the invention.

FIG. 5 shows a second embodiment of the scraping member, in which the outer cross-cuts 25 have been omitted and in which the same reference numbers of the previous figures have been used for the same parts.

The cleaning means for the centering device according to the invention, besides being efficient, are also inexpensive, in that they may be obtained simply by blanking the annular scraping members from a metal sheet or other suitable material, without the need to carry out complex and costly machining operations.

What has been described and shown with reference to the accompany drawings, has been given purely by way of example in order to illustrate the general features of the invention, and some of its preferred embodiments; consequently, other modifications to the centering device and scraping members are possible, without thereby deviating from the claims.

I claim:

1. Centering device for centering work pieces comprising:
a hollow casing having front and side walls;
a centering rod slidably supported by the casing, to protrude from a guide hole at the front wall;
actuation means operatively connected to the centering rod, to move the same rod from a retracted to an advanced position; and
cleaning means for cleaning the centering rod and preventing the infiltration of dirt, into the casing of the centering device;
wherein said cleaning means for the centering rod comprise:
at least one elastically yieldable annularly-shaped scraping member,
said annular scraping member having inner scraping edges and, an outer peripheral edge having a geometrical center;
a plurality of angularly spaced apart inner cross-cuts being provided to divide the scraping member into a plurality of scraping sections, each scraping section having an arch-shaped inner scraping edge, the scraping sections in a flat condition of the scraping member having a same bending radius, and bending centers differently arranged around the geometrical center of the scraping member; and
locking means for locking and conforming the scraping member against a conically-shaped annular shoulder surface, and to urge the inner edges of the scraping sections against side surface of the centering rod.

2. Centering device for work pieces according to claim 1, wherein the scraping member comprises a first set of inner cross-cuts which extend from the internal peripheral edge over part of width of the same scraping member.

3. Centering device for work pieces according to claim 2, wherein the inner cross-cuts are of linear type and extend radially to the annular scraping member of the centering device.

4. Centering device for work pieces according to claim 2, wherein the inner cross-cuts extend from the internal edge for a length equal to or more than one half the width of the scraping member.

5. Centering device for work pieces according to claim 1, wherein the scraping member comprises a second set of outer cross-cuts, which extend from the outer peripheral edge over part of the width of the scraping member.

6. Centering device for work pieces according to claim 5, wherein the outer cross-cuts have spaced apart side edges which open out towards the outer peripheral edge.

7. Centering device for work pieces according to claim 5, wherein the outer cross-cuts extend from the outer edge of the scraping member over a length equal to or less than one half the width of the annular scraping member of the centering device.

8. Centering device for work pieces according to claim 1, comprising at least a first and a second overlapped scraping members, wherein the cross-cuts of a scraping member are angularly spaced apart from the cross-cut of the other scraping member of the device.

9. Centering device for work pieces according to claim 1, comprising an elastically yielding support means for the scraping member disposed between the inner edge of the same scraping member and a resting surface of the casing.

10. Centering device for work pieces according to claim 1, wherein said locking means comprise a ring nut screwed onto a neck at the front wall of the hollow casing of the centering device, the neck being provided with said conically-shaped shoulder surface.

11. Centering device for work pieces according to claim 2, wherein the scraping member comprises a second set of outer cross-cuts, which extend from the outer peripheral edge over part of the width of the scraping member.

* * * * *